United States Patent
Jenko

(10) Patent No.: US 10,449,706 B2
(45) Date of Patent: Oct. 22, 2019

(54) HOT RUNNER NOZZLE WITH A GATE PRESSURE EQUALIZER

(71) Applicant: Husky Injection Molding Systems Ltd., Bolton (CA)

(72) Inventor: Edward Joseph Jenko, Essex, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 50 days.

(21) Appl. No.: 15/525,098

(22) PCT Filed: Nov. 16, 2015

(86) PCT No.: PCT/US2015/060792
§ 371 (c)(1),
(2) Date: May 8, 2017

(87) PCT Pub. No.: WO2016/081334
PCT Pub. Date: May 26, 2016

(65) Prior Publication Data
US 2018/0015653 A1    Jan. 18, 2018

Related U.S. Application Data

(60) Provisional application No. 62/080,477, filed on Nov. 17, 2014.

(51) Int. Cl.
*B29C 45/00* (2006.01)
*B29C 45/28* (2006.01)
*B29C 45/27* (2006.01)

(52) U.S. Cl.
CPC ...... *B29C 45/2806* (2013.01); *B29C 45/2735* (2013.01); *B29C 2045/2779* (2013.01)

(58) Field of Classification Search
None
See application file for complete search history.

(56) References Cited

U.S. PATENT DOCUMENTS

| 4,140,238 A | 2/1979 | Dawson |
| 5,219,512 A | 1/1993 | Tsutsumi |
| 5,238,393 A | 8/1993 | Kishi |
| 5,266,247 A | 11/1993 | Yokota |

(Continued)

OTHER PUBLICATIONS

International Search Report, 3 pages.

*Primary Examiner* — Jacob T Minskey

(57) ABSTRACT

A method and apparatus for equalizing gate pressure of a hot runner nozzle are disclosed. The nozzle includes a nozzle housing defining a primary melt channel, a first nozzle tip having a first secondary melt channel in fluid communication with the primary melt channel, a second nozzle tip having a second secondary melt channel in fluid communication with the primary melt channel, and a valve disposed in the primary melt channel for selectively opening and closing a downstream end of the primary melt channel to control a flow of melt to the first and second secondary melt channels. In some embodiments, the valve is configured to selectively open when a pressure of the melt reaches a threshold peak pressure. In some embodiments, the valve includes a valve stem that cooperates with the primary melt channel to block a flow of melt therefrom until the threshold peak pressure is established.

7 Claims, 5 Drawing Sheets

(56) References Cited

U.S. PATENT DOCUMENTS

| | | | |
|---|---|---|---|
| 6,017,210 | A | 1/2000 | Takayama et al. |
| 7,125,246 | B2 | 10/2006 | Schmidt |
| 7,306,454 | B2 | 12/2007 | Babin et al. |
| 7,322,817 | B2 | 1/2008 | Manner |
| 7,470,123 | B2 | 12/2008 | Spuller |
| 7,658,605 | B2 | 2/2010 | Fairy |
| 7,658,606 | B2 | 2/2010 | Klobucar et al. |
| 7,815,838 | B2 | 10/2010 | Zimmet |
| 2001/0048170 | A1* | 12/2001 | Wobbe ................ B29C 45/0005 264/40.1 |
| 2005/0045746 | A1 | 3/2005 | Blais |
| 2005/0255187 | A1 | 11/2005 | Kazmer |
| 2006/0257521 | A1 | 11/2006 | Spuller |
| 2008/0152752 | A1 | 6/2008 | Klobucar et al. |

* cited by examiner

HOT RUNNER NOZZLE WITH A GATE PRESSURE EQUALIZER

FIELD

This disclosed embodiments are generally directed to hot runners for injection molding machines, and more particularly to arrangements suitable for equalizing pressure of an edge or side gate nozzle.

BACKGROUND

Injection molding machines are used to produce plastic parts and some versions include hot runners with hot tip or valve gated nozzles. In hot runners having hot tip nozzles, the melt flow is controlled by controlling the heat and/or pressure at the nozzle tip, as is well known. In hot runners having a valve gated nozzle, a valve stem may be used to start and stop melt flow into the mold cavity by reciprocally moving the valve stem into open and closed positions, respectively. An actuator drives the valve stem between the open and closed positions.

SUMMARY

According to one embodiment, a hot runner nozzle for passing melt into a mold cavity is disclosed. The hot runner nozzle includes a nozzle housing defining a primary melt channel, a first nozzle tip having a first secondary melt channel in fluid communication with the primary melt channel, a second nozzle tip having a second secondary melt channel in fluid communication with the primary melt channel, and a valve disposed in the primary melt channel for selectively opening and closing a downstream end of the primary melt channel to control a flow of melt to the first and second secondary melt channels. In some embodiments, the hot runner nozzle is a side gate nozzle. The hot runner nozzle also may be a multi-probe nozzle. In some embodiments, the valve is configured to selectively open when a pressure of the melt reaches a threshold peak pressure. In some embodiments, the valve includes a valve stem slidably disposed in the primary melt channel. The valve may be positioned in a downstream end of the primary melt channel. The downstream end of the valve stem may cooperate with a downstream end of the primary melt channel.

According to another embodiment, a method of passing melt into mold cavities is disclosed. The method includes selectively closing a valve disposed in a primary melt channel of a nozzle housing to stop melt from flowing from the primary melt channel, pressurizing the melt in the primary melt channel until the pressure of the melt reaches a threshold peak pressure, and selectively opening the valve to allow the melt to flow from the primary melt channel to a first secondary melt channel defined in a first nozzle tip and a second secondary melt channel defined in a second nozzle tip. In some embodiments, the method also includes filling first and second mold cavities. The method also may include selectively closing the valve after the first and second mold cavities have been filled. In some embodiments, selectively closing the valve includes engaging a downstream end of a valve stem with a downstream end of the primary melt channel to block a flow of melt therefrom.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Edge and side gate nozzles for hot runners are well known. Generally, the edge or side gate nozzle includes several nozzle tips in a cluster, each of the nozzle tips being fluidly connected to a nozzle body (and manifold) to receive melted molding material, also referred to as "melt," that is passed to mold cavities. Traditionally, edge or side gate nozzles have poor short shot balance. That is, all of the gates of the hot runner may not fill evenly. For example, because the nozzle tips are located very close to one another, a plug of solidified molding material blown or pushed out of a first gate (or out of first and second gates), allowing melt to flow into the associated mold cavity, almost immediately drops the pressure to the other tips in the cluster. It should be appreciated that a plug of solidified molding material blown or pushed out of a gate is also known as a "plug blow" or a "gate pop." In some embodiments, a plug blow occurs when a melt pressure at the gate is sufficient to push the plug out of the gate. The immediate drop in pressure in the first (or first and second) gate may delay the plug blow of other gates until the pressure of the melt is rebuilt to, and in some embodiments exceeds, the melt pressure before the first plug blow. In some embodiments, sufficient melt pressure is established when the tips and cavities are filled and back pressure from the filled cavities allows the pressure in the remaining tip areas to again rise to the pressure level before the first (or first and second) gate popped. In one embodiment, a nozzle heater may be used to improve short shot balance by raising the melt temperature and, thus, the melt pressure. In some embodiments, even if all of the mold cavities are filled during the mold cycle, the volume of melt in each mold cavity may differ. In other embodiments, some, but not all, of the mold cavities may be filled during the mold cycle. These unbalanced short shots may cause inconsistencies in the parts fabricated by the hot runner and/or variations in cycle type.

Figure 1B:
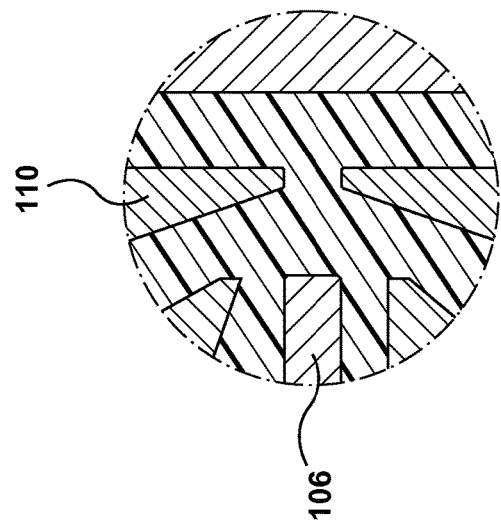
FIG. 1B is an enlarged cross-sectional schematic representation of the nozzle shown in the circle labeled 1B in FIG. 1A.
Figure 1A:
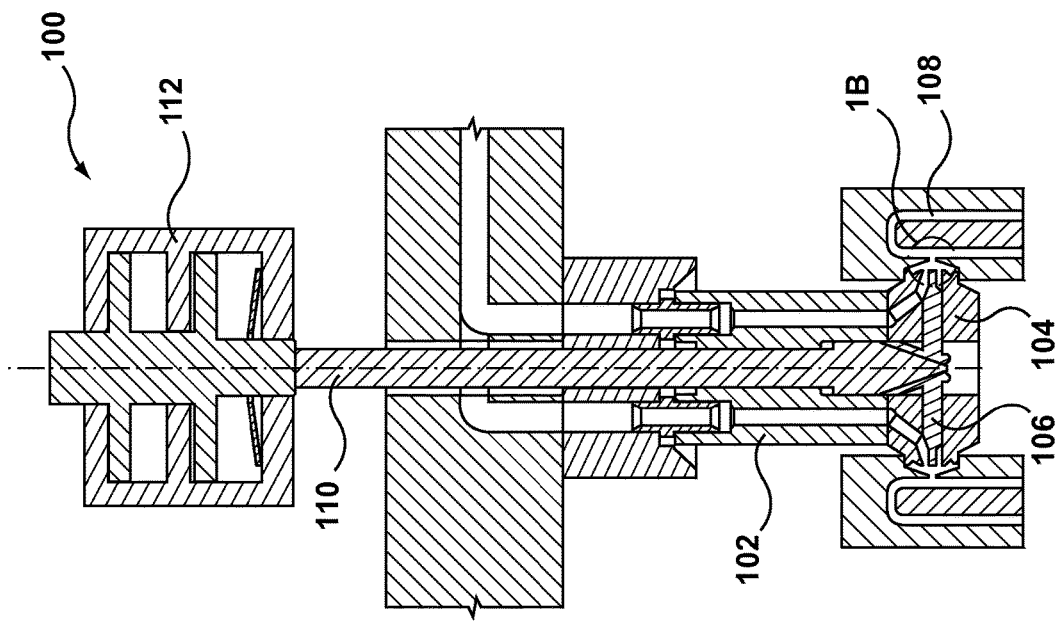
FIG. 1A is a cross-sectional schematic representation of a side gate nozzle according to the prior art.

Valve gated hot runners have been used to improve short shot balance, since gate opening and closing may be mechanically controlled. An example of a side gate nozzle 100 with a valve gate is illustrated in FIGS. 1A and 1B. In the embodiment shown in FIG. 1A, a nozzle body 102 is connected to the nozzle head 104, which has two gates. Each gate has a closure needle or valve pin 106 that is slidably received in the nozzle head 104 for opening and closing the gate to start and stop melt flow into the mold cavity 108, respectively. A rod 110 may be used to actuate the valve pins 106 and, as shown in FIG. 1A, may extend through the nozzle body 102. As illustrated in FIG. 1A, the rod 110 may be driven by an actuator 112.

Although such side gate nozzles having a valve pin at the tip may improve short balance, they are expensive and require more maintenance. Edge or side gate nozzles that are valve gated are also more space consuming, since each gate has its own valve pin, which results in inefficient mold layouts.

According to one aspect, a pressure equalizer for use with an edge gate or side gate nozzle is disclosed. In one embodiment, a valve stem is provided in the nozzle to close off the connection between the injection unit and the nozzle tips. Pressure is thereby allowed to build up in the entire hot runner, which acts like an accumulator for the impending injection into the cavities. Once a threshold peak pressure is reached, the valve stem is opened and nearly instantly all of the nozzle tips and gates are pressurized to an equivalent peak pressure, which is sufficient to push the plugs out of the gates and allow melt to flow into the mold cavities. The threshold peak pressure is chosen to be sufficiently greater than a pressure of a gate most resistant to popping (e.g., the gate most resistant to pushing the plug out of the gate), which may thereby cause all of the gates in the housing to pop simultaneously and, thus, may cause the beginning of melt flow into the cavities to be more balanced. Once the mold cavities are filled, or substantially filled, the valve stem may be re-closed.

Figure 2:
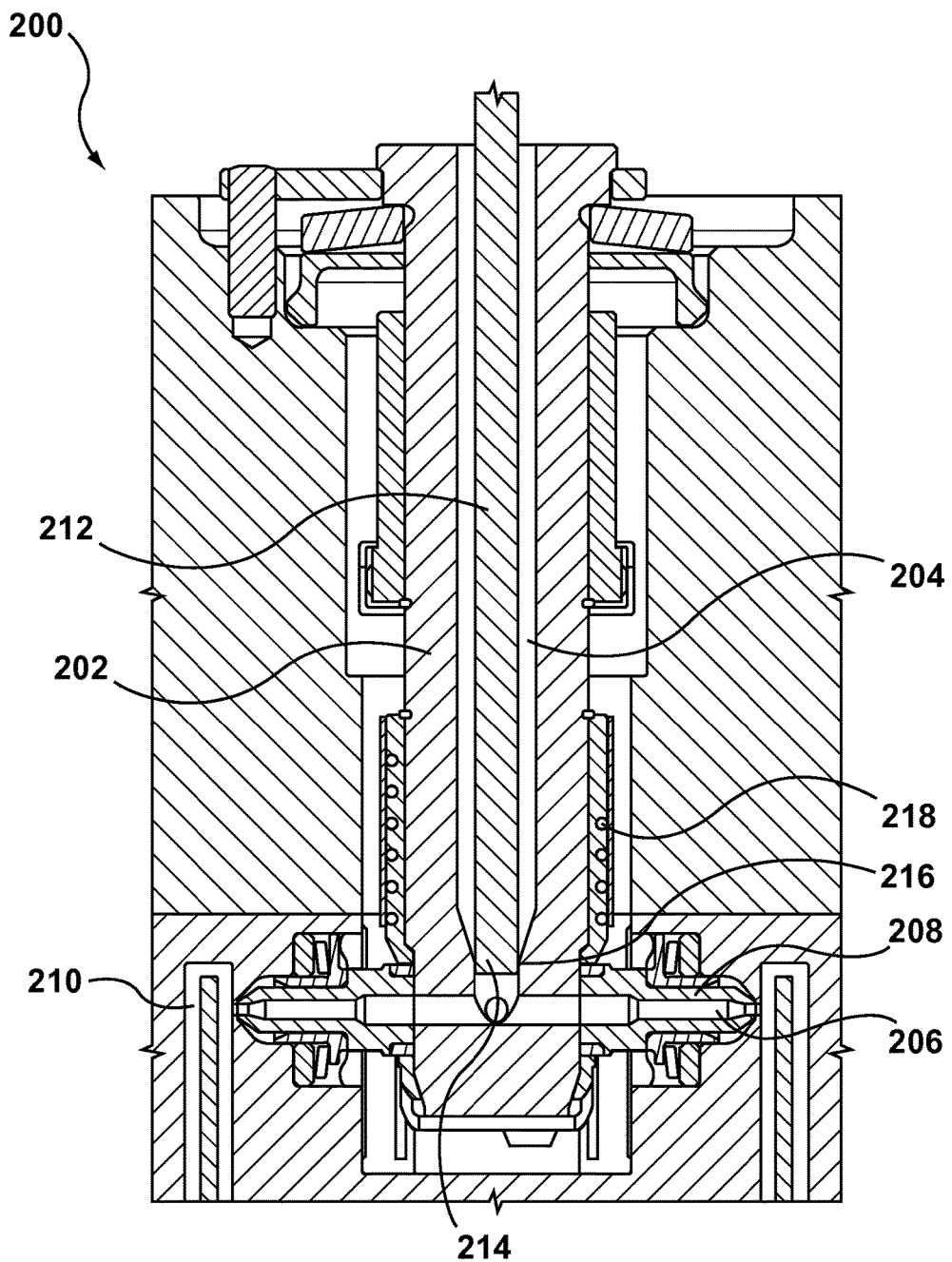
FIG. 2 is a cross-sectional schematic representation of a side gate nozzle having a pressure equalizer according to one embodiment.

FIG. 2 illustrates an embodiment in which the pressure equalizer is disposed in a side gate nozzle 200. As shown in this figure, the side gate nozzle 200 includes a nozzle housing 202 having a melt bore or primary melt channel 204, which is fluidly connected to a secondary melt channel 206 in each nozzle tip 208. As the name suggests, the nozzle tips 208 extend outwardly from a side of the nozzle housing 202. In some embodiments, the nozzle tips 208 are attached (e.g., screwed) to the mold in fixed relation to respective mold cavities 210, and as the nozzle housing 202 expands with heat, the primary melt channel 204 aligns with the secondary melt channels 206. Alternatively, the nozzle tip may be directly attached to the nozzle body. As shown in FIG. 2, the nozzle 200 may include two nozzle tips 208 and two corresponding secondary melt channels 206 in some embodiments, while in other embodiments, the nozzle 200 may include more or fewer nozzle tips and, thus, more or fewer secondary melt channels. For example, in some embodiments, the nozzle 200 may include 4, 8 or 12 nozzle tips and 4, 8, or 12 corresponding secondary melt channels. As shown in FIG. 2, each of the secondary melt channels 206 passes melt to a mold cavity 210.

As previously described, the pressure equalizer allows the melt pressure of the nozzle 200 to build up to at least the threshold peak pressure (e.g., the pressure sufficient to overcome the most resistant gate) before beginning to fill each of the mold cavities. The pressure equalizer may include a valve stem 212 that is slidably received in the primary melt channel 204 and that reciprocally moves into open and closed positions to start and stop melt flow from the primary melt channel 204, respectively.

FIG. 2 illustrates an embodiment in which the pressure equalizer, i.e., the valve stem 212, is in a closed position, thus allowing the melt pressure to build up. In some embodiments, the downstream end 214 of the valve stem 212 cooperates with a downstream end 216 of the primary melt channel 204 to close the primary melt channel 204 and block melt from flowing therefrom. In such an embodiment, the downstream end 214 of the valve stem 212 may fit tightly within the downstream end 216 of the primary melt channel 204 (e.g., there is no space between the downstream end 214 of the valve stem 212 and the downstream end 216 of the primary melt channel 204), thus preventing melt from flowing to the secondary melt channels 206.

Figure 5B:
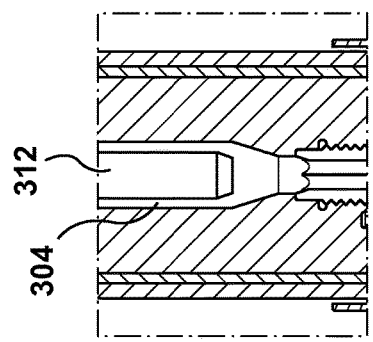
FIG. 5B is a cross-sectional schematic representation of the nozzle shown in the box labeled 5B in FIG. 5A, with the pressure equalizer in an open position.
Figure 5A:
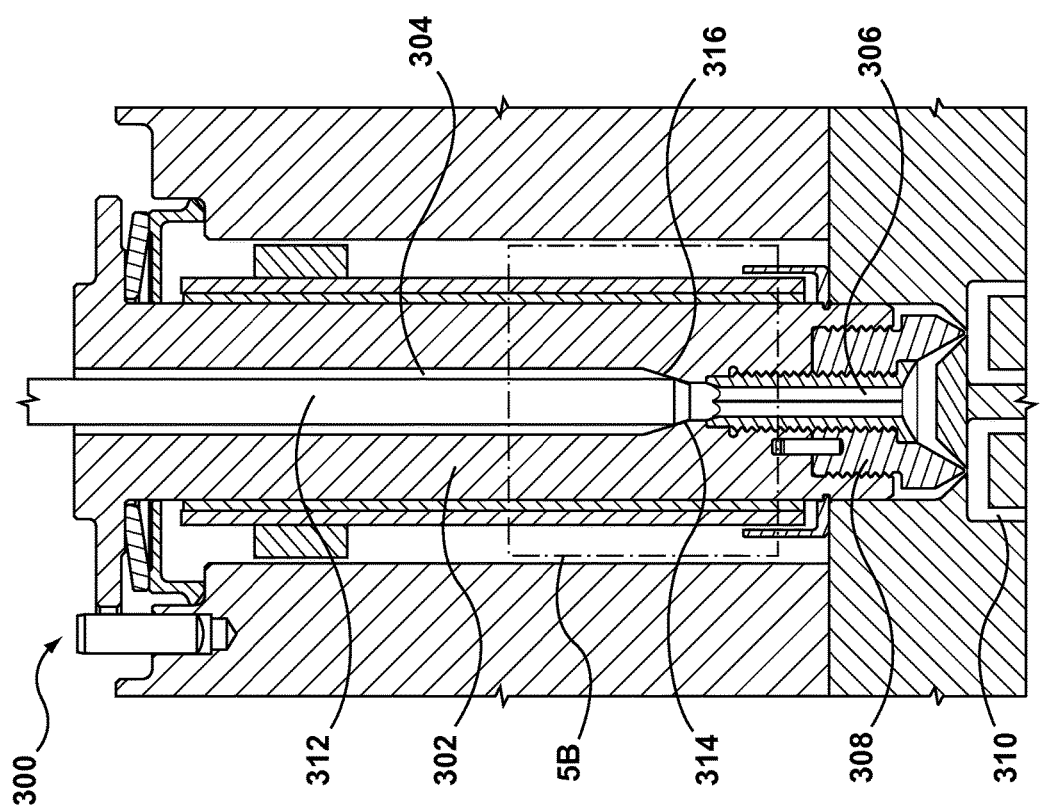
FIG. 5A is a cross-sectional schematic representation of an edge gate nozzle with a pressure equalizer according to another embodiment.

The shape and size of the downstream end 214 of the valve stem 212 may correspond to the shape and size of the downstream end 216 of the primary melt channel 204. For example, as shown in FIG. 2, in one embodiment, the downstream end 214 of the valve stem 212 has a cylindrical shape that corresponds with a cylindrically-shaped downstream end 216 of the primary melt channel 204. It should be appreciated that other suitable shapes of the valve stem and of the primary melt channel may be used to close the primary melt channel as this aspect of the disclosure is not limited in this regard. For example, as shown in FIGS. 5A and 5B, the downstream end 314 of the valve stem 312 may be tapered and may cooperate with a tapered downstream end 316 of the primary melt channel 304. In another embodiment, the downstream end of the valve stem may have a truncated conical shape that corresponds with the shape of the downstream end of the primary melt channel 204.

As should be appreciated, although the valve stem is shown to cooperate with the downstream end of the primary melt channel, the valve stem also may cooperate with other suitable portions of the primary melt channel. In some embodiments, for example, the valve stem may cooperate with an upstream portion of primary melt channel, while in other embodiments the valve stem may cooperate with an end of the primary melt channel where the primary melt channel splits to fluidly communicate with each of the secondary melt channels.

Figure 3:
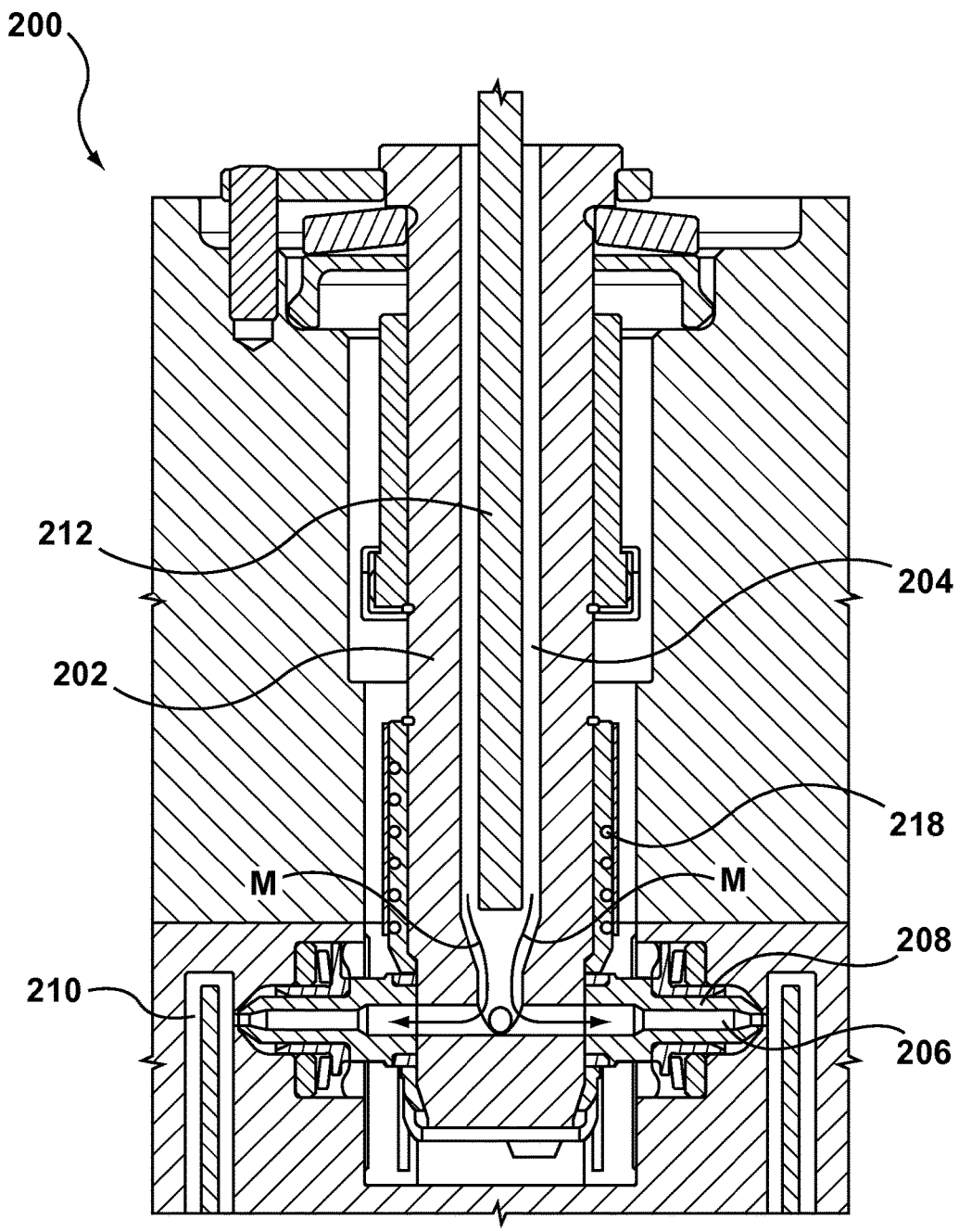
FIG. 3 is a cross-sectional schematic representation of the nozzle of FIG. 2 with a pressure equalizer in an open position configured as a valve stem.

FIG. 3 illustrates the nozzle of FIG. 2 after the melt pressure has reached the threshold peak pressure. As shown in this figure, the valve stem 212 has been moved into a retracted (opened) position, thus allowing a flow of melt to travel from the primary melt channel 204 to the secondary melt channel 206, as indicated by arrows M. In this embodiment, when the valve stem 212 is moved into the opened position, both of the secondary melt channels 206 will be nearly immediately and equally pressurized, which may allow each of the gates to pop and for melt to pass into the mold cavities 210. As will be appreciated, once the mold cavities have been filled or substantially filled and the gate is frozen, the valve stem 212 may be returned to the closed position shown in FIG. 2 to rebuild melt pressure for another mold cycle.

As shown in FIGS. 2 and 3, in some embodiments, the nozzle 200 includes a heater 218, which may be located around the nozzle housing 202, although the heater may have other suitable positions for heating the melt. In some embodiments, the heater 218 assists in building up the pressure of the melt by increasing the melt temperature.

FIGS. 4 and 5 illustrate embodiments in which the pressure equalizer is used in a multi-probe nozzle. Similar to the previous embodiments, in these embodiments the nozzle 300 includes a nozzle housing 302 with a primary melt channel 304 that is fluidly connected to secondary melt channels 306. As shown in FIGS. 4 and 5, the secondary melt channels 306 are located in nozzle tips 308, the secondary melt channel 306 passing melt to mold cavities 310. In these embodiments, the cluster of nozzle tips 308 and corresponding secondary melt channels 306 are located at a downstream end of the nozzle housing 302. As should be appreciated, the nozzle tips 308 may be integrally formed with the nozzle housing 302 in some embodiments, while in other embodiments the nozzle tips 308 may be separate from the nozzle housing 302. In such embodiments, the nozzle tips 308 may be permanently attached to the nozzle housing 308 or may be removably attachable.

Figure 4B:
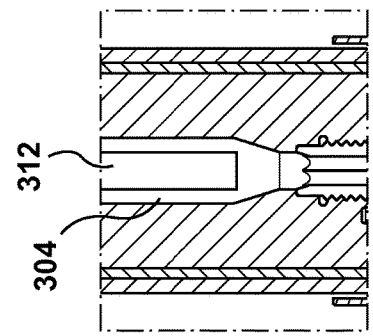
FIG. 4B is a cross-sectional schematic representation of the nozzle shown in the box labeled 4B in FIG. 4A, with the pressure equalizer in an open position.
Figure 4A:
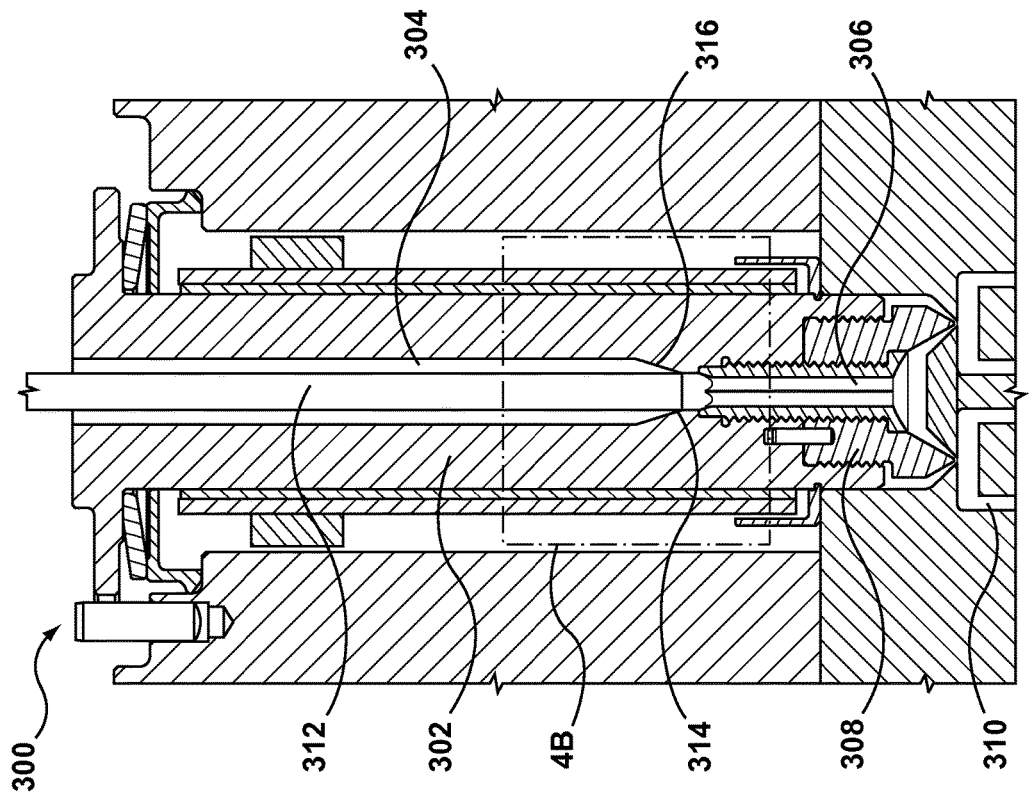
FIG. 4A is a cross-sectional schematic representation of an edge gate nozzle with a pressure equalizer according to another embodiment.

As with the previous embodiments, in the embodiments shown in FIGS. 4 and 5, the pressure equalizer includes a valve stem 312 that is slidably disposed in the primary melt channel 304 and that reciprocally moves into open and closed positions to start and stop melt flow from the primary melt channel 304, respectively. FIG. 4A illustrates a valve stem having a cylindrically-shaped downstream end that cooperates with a cylindrically-shaped downstream end of the primary melt channel 304. As previously described, FIG. 5A illustrates an embodiment in which the valve stem 312 has a tapered downstream end 314 that corresponds with a tapered downstream end 316 of the primary melt channel 304. FIGS. 4B and 5B illustrate embodiments in which the threshold peak pressure of the melt has been established and the valve stems 312 have been moved into a retracted (opened) position, thus allowing the melt to pass from the primary melt channel 304 to the secondary melt channels 306 to pop the gates for filling the mold cavities 310.

In some embodiments, the movement of the valve stems 212, 312 may be driven by an actuator (not shown). As should be appreciated, a hydraulic, pneumatic or electric actuator may be used to drive valve stem 212, 312 movement. In some embodiments, the actuator may include a piston (not shown) to drive valve stem movement, while in other embodiments the actuator (not shown) may include a motor (not shown), such as a servomotor, to drive valve stem movement.

Although the nozzles 200, 300 are shown and described as having one nozzle housing with a plurality of clustered nozzle tips 208, 308, in other embodiments the nozzles 200, 300 may include multiple nozzle housings, each nozzle housing having the plurality of clustered nozzle tips extending therefrom. In such embodiments, the nozzles may be configured to simultaneously move all of the valve stems into the opened position once the threshold peak pressure is established in all of the primary melt channels. That is, one controller (not shown) may be configured to control all of the valve stems. In other embodiments, the nozzles may be configured such that each valve stem may be independently controllable. For example, once the threshold peak pressure is established in a first nozzle housing, the corresponding first valve stem may be moved into an opened position to allow the melt to be passed from the first primary melt channel to the first secondary melt channel. In such an embodiment, a second valve stem in a second primary melt channel will be moved into the opened position only when the threshold peak pressure is reached in the second nozzle housing. As should be appreciated, the threshold peak pressures of the first and second nozzle housings may be reached at the same time in some embodiments, while in other embodiments the threshold peak pressures of the first and second nozzle housings may be reached at different times. As such, while the first and second valve stems may be moved at the same time, they also may be moved at different times.

Although the pressure equalizers have been shown and described as having a valve stem to open and close the primary melt channel to build up the melt pressure to at least the threshold peak pressure and thereafter equally pressurize all of the gates, a person having ordinary skill in the art should appreciate that other mechanisms or arrangements for opening and closing the primary melt channel (and building melt pressure) may the used. For example, a rotary valve may be incorporated in or upstream of the nozzle melt channel.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A hot runner nozzle (200, 300) for passing melt into a mold cavity (210, 310), the hot runner nozzle comprising:
    a nozzle housing (202, 302) defining a primary melt channel (204, 304);
    a first nozzle tip (208, 308), the first nozzle tip (208, 308) having a first secondary melt channel (206, 306) in fluid communication with the primary melt channel (204, 304);
    a second nozzle tip (208, 308), the second nozzle tip (208, 308) having a second secondary melt channel (206, 306) in fluid communication with the primary melt channel (204, 304); and
    a valve disposed in the primary melt channel (204, 304) for selectively moving between an open and a closed position, in the closed position melt is stopped from flowing out of a downstream end (216, 316) of the primary melt channel (204, 304), and in the open position melt is allowed to flow from the primary melt channel to the second secondary melt channels (206, 306).

2. The hot runner nozzle according to claim 1, wherein the hot runner nozzle is a side gate nozzle.

3. The hot runner nozzle according to claim 1, wherein the hot runner nozzle is a multi-probe nozzle.

4. The hot runner nozzle according to claim 3, wherein the valve is configured to selectively open when a pressure of the melt reaches a threshold peak pressure.

5. The hot runner nozzle according to claim 4, wherein the valve comprises a valve stem (212, 312) slidably disposed in the primary melt channel (204, 304).

6. The hot runner nozzle according to claim 4, wherein the valve is positioned in a downstream end (216, 316) of the primary melt channel (204, 304).

7. The hot runner nozzle according to claim 5, wherein a downstream end (214, 314) of the valve stem (212, 312) cooperates with a downstream end (216, 316) of the primary melt channel (204, 304).

* * * * *